United States Patent
Boardman, IV et al.

(10) Patent No.: US 6,330,809 B1
(45) Date of Patent: Dec. 18, 2001

(54) APPLICATION OF A CHILLER IN AN APPARATUS FOR COOLING A GENERATOR/MOTOR

(75) Inventors: William Hunter Boardman, IV, Burnt Hills; Dewey Reed Bosley, Ballston Lake, both of NY (US); Edward Paul Sapiro, Chesapeake, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/726,541

(22) Filed: Dec. 8, 2000

(51) Int. Cl.$^7$ ...................................................... F25D 17/02
(52) U.S. Cl. ................... 62/434; 62/79; 62/237
(58) Field of Search ............................... 62/430, 431, 434, 62/436, 79, 98, 99, 185, 201, 89, 237; 123/41.01

(56) References Cited

U.S. PATENT DOCUMENTS

| | | | |
|---|---|---|---|
| 4,835,977 | * | 6/1989 | Haglund et al. ............................ 62/89 |
| 5,125,378 | * | 6/1992 | Westerbeke, Jr. .............. 123/41.01 X |
| 5,386,687 | * | 2/1995 | Frutschi . |
| 6,018,942 | * | 2/2000 | Liebig . |

* cited by examiner

Primary Examiner—Henry Bennett
Assistant Examiner—Chen-Wen Jiang
(74) Attorney, Agent, or Firm—Nixon & Vanderhye P.C.

(57) ABSTRACT

A generator/motor cooling apparatus comprising a cooler for cooling gas used to cool the generator/motor, the gas flowing serially across first and second heat exchangers that are supplied with water from an ambient source; and a chiller having an evaporator and a condenser with a closed refrigerant circuit between the evaporator and condenser; wherein water supplied to the second heat exchanger is chilled in the evaporator and returned to the second heat exchanger and water from the ambient source acts as the heat sink for the condenser side of the chiller. A method for increasing the cooling efficiency of a generator/motor cooler that includes first and second heat exchangers operating in parallel, utilizing water form a common ambient source, and with gas to be cooled flowing past the first and second heat exchangers in series, the method comprising a) diverting some or all of the water exiting the second heat exchanger to a chiller where the water is chilled; and b) returning the chilled water to the second heat exchanger.

20 Claims, 1 Drawing Sheet

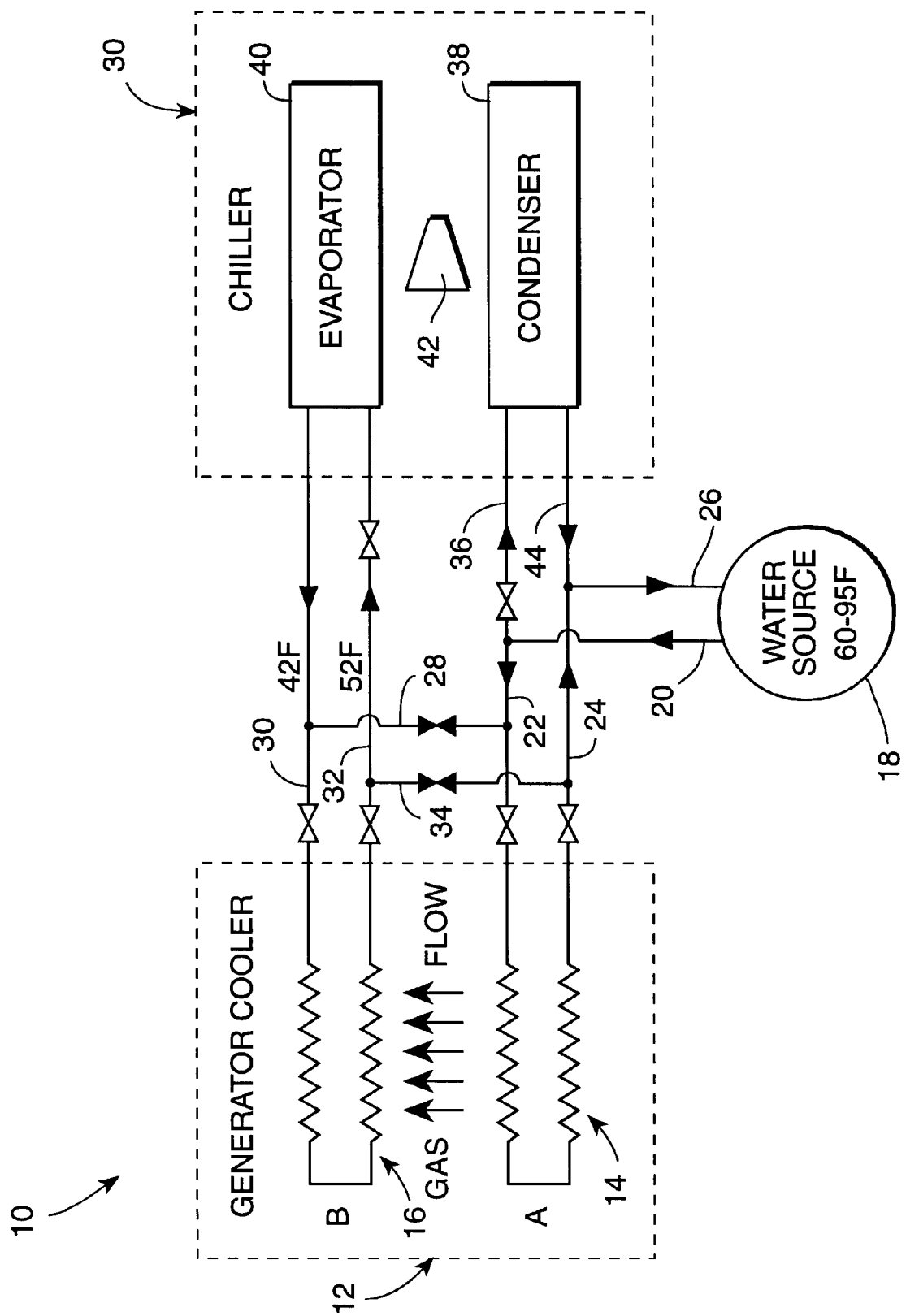

APPLICATION OF A CHILLER IN AN APPARATUS FOR COOLING A GENERATOR/MOTOR

This invention relates generally to the cooling of generators/motors and specifically, to the application of a chiller in series with a conventional coolant source to increase generator/motor capability.

BACKGROUND OF THE INVENTION

The capacity of the machinery to convert energy from mechanical to electrical or vice versa is directly related to the rate of which the excess heat can be removed. Currently, the gas which is used to cool electrical machinery, such as a motor or generator, whether hydrogen or air, is typically cooled by a heat exchanger in the system that transfers the heat to a fluid such as water or anti-freeze mixture. This coolant then rejects the heat to the atmosphere through a second heat exchanger. Therefore, the cooling capacity is limited by the temperature of the heat sink. In hot climate regions of the world, this severely reduces the cooling capacity and limits generator/motor capability.

Duplex series coolers are currently used on generators ranging from 25 MW to 1300 MW. Coolant supplied to these coolers comes from a common "ambient following source." Assuming the two cooler sections are constructed with identical hardware (for example, tube and fin count), the first section removes about 75% of the heat load, and the second section removes the remaining 25%, i.e., the gas flows over the heat exchangers "in series." Every effort has been made to reduce the approach temperature difference between the cold liquid temperature and ambient temperature, and between the generator cold gas and cold liquid temperature using extended tube and fin technology. This closes the gap between the generator cold gas and ambient air temperature, but the generator output is still limited by the temperature of the ambient following source.

Chillers have been applied to generators in the past, but not as described herein where the chiller technology is used to step cool the gas in a duplex series cooler arrangement.

BRIEF SUMMARY OF THE INVENTION

This invention seeks to provide a means for lowering the overall cost of producing power by cooling the generator/motor more efficiently. To obtain additional cooling capacity, chilled coolant is circulated through a second heat exchanger downstream of the ambient following or first exchanger. Arranging them in series (relative to the gas flow) greatly increases the cooling efficiency and reduces the required size of the chiller since only a portion of the heat is rejected to the chiller.

The (refrigeration) chiller unit also offers the ability to control the coolant temperature independent of the ambient temperature. The coolant temperature can be set to a constant (as low as 42° F.) which is ideal for constant load steam turbine generator applications, or the chiller can be programmed to deliver cold liquid as a function of the ambient temperature ideal for gas turbine ambient following machines. It will be understood, however, that the coolant temperature cannot be so low as to freeze the evaporator section of the chiller.

More specifically, this invention provides for the application of a reciprocating, centrifugal or absorption chiller to provide chilled water to a second heat exchanger downstream of a first or ambient water source exchanger so as to significantly improve generator/motor cooling while minimizing the cost associated with the chiller. This invention simply maximizes the temperature difference from hot gas to cold liquid in both exchanger sections to maximize heat transfer and generator cooling. Although power is required to run the chiller, the series arrangement minimizes the size of the chiller required, which lowers the power consumption to only a small fraction of the increase power output obtained by more effective cooling.

In accordance with one aspect of the invention, there is provided a generator/motor cooling apparatus comprising a cooler for cooling gas used to cool the generator/motor, the gas flowing serially across first and second heat exchangers that are supplied with water from an ambient source; and a chiller having an evaporator and a condenser with a closed refrigerant circuit between the evaporator and condenser; wherein water from the ambient source supplied to the second heat exchanger is chilled in the evaporator and returned to the second heat exchanger.

In another aspect, the invention provides a method for increasing the cooling efficiency of a generator/motor cooler that includes first and second heat exchangers operating in parallel, utilizing water from a common ambient source, and with gas to be cooled flowing past the first and second heat exchangers in series. The method comprises: a) diverting some or all of the water exiting the second heat exchanger to a chiller where the water is chilled; and b) returning the chilled water to the second heat exchanger.

BRIEF DESCRIPTION OF THE DRAWINGS

The single FIGURE illustrates in flow diagram form, a cooling arrangement which integrates a chiller with conventional generator cooling apparatus in accordance with the subject invention.

DETAILED DESCRIPTION OF THE INVENTION

Referring to FIG. 1, a generator/motor cooling diagram 10 illustrates an exemplary embodiment of the invention. Specifically, the cooling apparatus for a generator or motor includes a series duplex generator cooler 12 that contains first and second heat exchangers 14, 16 that serve to cool in series the gas flow traveling in the direction indicated by the flow arrows. Cooling water is supplied from an ambient water source 18 (that could be a river or other suitable source of water). The water at source 18 is typically at a temperature of between about 60° and 95° F., and is most efficient when it is cleaned or treated water (i.e., has a low tube fouling factor). This cooling water is supplied via pipe 20 to a pipe 22 that, in turn, supplies the cooling water to the inlet of the first or ambient following heat exchanger 14. After heat exchange with the gas flow, the water returns via pipes 24 and 26 to the water source 18, which also serves as a heat sink.

The second heat exchanger 16 runs in parallel with heat exchanger 14. Thus, cooling water from the water source 18 is simultaneously supplied to the inlet of the second heat exchanger 16 via pipes 20, 22, 28 and 30 and is returned to the water source 18 via pipes 32, 34, 24 and 26. The arrangement as described to this point is conventional. Typically, the mean temperature difference between the inlet and outlet of the first exchanger 14 has been about 11°, while the mean temperature difference between the inlet and outlet of the second heat exchanger has been about 3°.

Referring again to the FIGURE, this invention incorporates a chiller 30 into the series duplex cooler 12 as already described. The chiller 30 may be of any suitable type, and, for example, may be one sold by McQuay Air Conditioning, or by Snyder General. Here, the cooling water from source 18 is also supplied via pipes 20 and 36 to the chiller condenser 38, where it is passed in heat exchange relationship with a refrigerant such as Freon, that flows in a closed loop between the chiller evaporator 40 and condenser 38 via pump 42. Heat rejected to the water in the chiller condenser 38 is returned to the water source 18 via pipes 44 and 26. Thus, source 18 acts as a heat sink for both the first heat exchanger and the chiller condenser 38. Condensed Freon flows to the evaporator 40 where it passes in heat exchange relationship with heated water from the second heat exchanger 16, as supplied to the evaporator via pipe 32. Note that when the chiller is in use, heated water from the second heat exchanger 16 is not normally returned to the ambient source 18 (i.e., it is isolated from the ambient source), but pipe 28 and appropriate valving are in place to bypass the chiller and return the water to the source 18 when the chiller (with suitable controls) is taken out of service, or when throttling of the water to the chiller is desired to control the temperature of the chilled water entering the second heat exchanger. Cold or chilled water is then returned to the second heat exchanger 16 via pipe 30, at a temperature as low as about 42° F. This chilled water is the coldest water used in the cooler 12 and results in the mean temperature difference between the inlet and outlet of the second heat exchanger being increased to about 10° F. This is significant because the hot gas sees the warmer water in exchanger 14 first, while the cooled gas sees the colder water in the second exchanger 16, thus increasing the heat transfer rate. Moreover, the arrangement described above permits a smaller ambient water source due to the use of the chiller 30, but also a smaller chiller since only part of the water from ambient source 18 is circulated through the chiller. The smaller the chiller, the lower the power consumption. Thus, a small air cooled generator with duplex series coolers with 95° inlet water temperature can increase power output by about 25% utilizing chilled water at 42° F. in the second cooler section in the heat exchanger. The only penalty is a 1 to 1.5% chiller power consumption.

It will be appreciated that intermediate heat exchangers may be added to avoid open loop contamination of the chiller exchangers.

The intermediate piping and valves (as shown in the FIGURE) are required to isolate individual exchangers for maintenance, as well as to allow the chiller to be taken out of service when the source water temperature drops to a point where chiller operation is not necessary. Such piping and valving is well within the skill of the art and need not be described in detail herein.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator/motor cooling apparatus comprising:
   a cooler for cooling gas used to cool the generator/motor, the gas flowing serially across first and second heat exchangers that are supplied with water from an ambient source; and
   a chiller having an evaporator and a condenser with a closed refrigerant circuit between the evaporator and condenser;
   wherein water supplied to the second heat exchanger is chilled in the evaporator and returned to the second heat exchanger.

2. The apparatus of claim 1 wherein water supplied to the first heat exchanger is returned to the ambient source.

3. The apparatus of claim 1 wherein a first portion of the water supplied to the second heat exchanger is returned to the ambient source and a second portion of the water supplied to the second heat exchanger is returned to the evaporator where it is chilled by heat exchange with the refrigerant.

4. The apparatus of claim 1 wherein the water leaving the second heat exchanger is isolated from the ambient water source and circulated through the chiller.

5. The apparatus of claim 1 wherein the temperature of the chilled water supplied by the chiller is as low as 42° F.

6. The apparatus of claim 1 wherein chiller controls are used to set the chilled water temperature entering the second heat exchanger.

7. The apparatus of claim 1 wherein the temperature of the water supplied by the ambient source is about 60°–95° F.

8. The apparatus of claim 1 wherein a portion of the water supplied by the ambient source is diverted to the condenser where it absorbs heat from the refrigerant and is returned to the ambient source.

9. The apparatus of claim 1 wherein said first and second heat exchangers operate in parallel.

10. The apparatus of claim 1 wherein the chiller is a reciprocating chiller.

11. The apparatus of claim 1 wherein the chiller is a centrifugal chiller.

12. The apparatus of claim 1 wherein the chiller is an absorption chiller.

13. The apparatus of claim 3 wherein one or more valves control the portion of water from the second heat exchanger that is returned to the ambient source.

14. The apparatus of claim 1 wherein means are provided for isolating the chiller when ambient temperature drops below a predetermined temperature.

15. A method for increasing the cooling efficiency of a generator/motor cooler that includes first and second heat exchangers operating in parallel, utilizing water form a common ambient source, and with gas to be cooled flowing past the first and second heat exchangers in series, the method comprising:
   a) diverting some or all of the water exiting the second heat exchanger to a chiller where the water is chilled; and
   b) returning the chilled water to the second heat exchanger.

16. The method of claim 15 wherein at least some of the water supplied by the ambient source is diverted to a condenser side of the chiller where it is heated and returned to the ambient source.

17. The method of claim 16 wherein said chiller includes an evaporator and a condenser and a closed refrigerant circuit therebetween; and wherein, during step a), the water from the second heat exchanger is passed in heat exchange relationship with a refrigerant in the closed circuit, thereby evaporating the refrigerant and chilling the water.

18. The method of claim 17 wherein evaporated refrigerant is returned to the condenser, and wherein the water from the ambient source is heated by heat exchange with the refrigerant, thereby condensing the refrigerant.

19. The method of claim 17 including utilizing the ambient source as a heat sink for both the first heat exchanger and the condenser.

20. A generator/motor cooling apparatus comprising:
   a cooler for cooling gas used to cool the generator/motor, the gas flowing serially across first and second heat exchangers that are supplied with water from an ambient source; and
   means independent of the ambient water source for chilling water exiting the second heat exchanger as low as 42° F. and returning the chilled water to the second heat exchanger.

\* \* \* \* \*

UNITED STATES PATENT AND TRADEMARK OFFICE
CERTIFICATE OF CORRECTION

PATENT NO.     : 6,330,809 B1
DATED          : December 18, 2001
INVENTOR(S)    : Boardman, IV et al.

It is certified that error appears in the above-identified patent and that said Letters Patent is hereby corrected as shown below:

<u>Title page</u>,
Item [57], ABSTRACT,
Line 13, delete "form" and insert -- from --.

Signed and Sealed this

Eleventh Day of June, 2002

Attest:

Attesting Officer

JAMES E. ROGAN
*Director of the United States Patent and Trademark Office*